(12) United States Patent
Chino (10) Patent No.: US 7,880,805 B2
(45) Date of Patent: Feb. 1, 2011

(54) METHOD OF CALCULATING RATIO OF VISIBLE LIGHT COMPONENT AND IMAGE PICKUP APPARATUS USING SAME

(75) Inventor: Shunsuke Chino, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 380 days.

(21) Appl. No.: 11/670,000

(22) Filed: Feb. 1, 2007

(65) Prior Publication Data
US 2007/0182836 A1 Aug. 9, 2007

(30) Foreign Application Priority Data
Feb. 6, 2006 (JP) ............................. 2006-028923

(51) Int. Cl.
*H04N 5/225* (2006.01)
(52) U.S. Cl. ...................... 348/361; 348/342
(58) Field of Classification Search .............. 348/216.1, 348/342–344, 360–361
See application file for complete search history.

(56) References Cited

U.S. PATENT DOCUMENTS 6,449,013 B1 * 9/2002 Suzuki et al. ................ 348/279
2003/0142221 A1 * 7/2003 Takakuwa ................. 348/222.1

* cited by examiner

*Primary Examiner*—Sinh Tran
*Assistant Examiner*—Jason A Flohre
(74) *Attorney, Agent, or Firm*—Cowan, Liebowitz & Latman, P.C.

(57) ABSTRACT

An image pickup apparatus in which color signals are generated and extracted from a picked-up image signal for a plurality of regions in a screen, a wavelength component ratio is detected and calculated based on the extracted color signals for each of the plurality of regions, one or more regions in which the visible light component ratio calculated is large are selected, and the visible light component ratio of the photographing screen is determined based on the visible light component ratios of the selected regions.

2 Claims, 13 Drawing Sheets

METHOD OF CALCULATING RATIO OF VISIBLE LIGHT COMPONENT AND IMAGE PICKUP APPARATUS USING SAME

BACKGROUND OF THE INVENTION

1. Field of the Invention

The present invention relates to an image pickup apparatus having an expanded photographing region ranging from the visible wavelength region to the infrared wavelength region. In particular, the present invention relates to a visible light component ratio calculation method for calculating the ratio of the visible wavelength component contained in the light emitted from a light source for illuminating an object to be photographed and to an image pickup apparatus using such a visible light component ratio calculation method.

2. Description of the Related Art

There are prior arts such as the image pickup apparatus disclosed in Japanese Patent Application Laid-Open No. 2000-224469 and the camera provided with a shooting mode switching function disclosed in Japanese Patent Application Laid-Open No. 2003-219254. These prior arts relate to a dual-purpose infrared/visible-light camera that is adapted to switch the shooting mode automatically and insert/retract an infrared cut filter automatically. According to these prior arts, the shooting mode is determined based on a brightness signal and a color signal obtained from an image-pickup element.

In the above mentioned prior arts, when the current shooting mode is color shooting mode, the shooting mode is determined based on whether a brightness signal Y is larger or smaller than a predetermined threshold value Y2. On the other hand, when the current shooting mode is black-and-white shooting mode, the shooting mode is determined based on whether the brightness signal Y is larger than or smaller than another predetermined threshold value Y1. Here, one threshold value Y1 is set to a value larger than the other threshold value Y2 (Y1>Y2). This condition is introduced in order to prevent hunting that may occur when the shooting mode is switched from black-and-white shooting mode to color shooting mode with a rise in the brightness signal caused by removal of the infrared filter.

Furthermore, when the current shooting mode is black-and-white shooting mode, color signals are also analyzed in addition to the brightness signal in determining the shooting mode. The analysis of the color signals are performed by obtaining two color ratios or the ratio of the red signal and the green signal and the ratio of the blue signal and the green signal. A determination is made as to whether the picked-up image signal is derived from near-infrared light or visible light based on whether the aforementioned two color ratios fall within a specified distribution range. Referring to sensitivity characteristics of the image pickup element for respective colors, in the wavelength region longer than approximately 800 nm, the sensitivity is substantially identical irrespective of colors. When the picked-up image signal is derived from near-infrared light, the aforementioned two color ratios fall within the specified distribution range. When it is determined that the picked-up image signal is derived from near-infrared light, the black-and-white shooting mode is not changed.

In the case of the camera provided with a shooting mode switching function disclosed in Japanese Patent Application Laid-Open No. 2003-219254, when a large field is shot, the color signals are averaged over the entire photographing screen, and it is not possible to extract a characteristic point. As a countermeasure, the photographing screen is divided into a plurality of blocks, and a determination is made as to whether the picked-up image signal is derived from near-infrared light or not for each block, and the number of the blocks in which the picked-up image is derived from near-infrared light is counted. According to the disclosure of this patent document, a determination is made as to whether the picked-up image signal is derived from visible light or near-infrared light based on the count number thus obtained.

In conventional cameras, under a mixed light source such as incandescent lighting or sunlight that contains both visible components and infrared components, the brightness in the picture frame in shooting becomes unstable at the time when the infrared cut filter is inserted or removed. For example, in the case where a green or blue object is shot under incandescent lightening, the lighting may be misinterpreted as infrared lighting even if the brightness of the subject is sufficiently high, and the photographing mode is not switched to color shooting mode in some cases. In other cases, hunting may occur.

SUMMARY OF THE INVENTION

An object of the present invention is to eliminate the above described problem in the prior arts. Specifically, an object of the present invention is to provide a wavelength component ratio calculation method that makes it possible to perform insertion/removal of an infrared cut filter stably under a mixed light source condition, and to provide an image pickup apparatus using such a method.

A method of calculating the wavelength component ratio that is intended to achieve the above described object utilizes an apparatus that can pick up an image formed by light in a wavelength region ranging from a visible wavelength region to an infrared wavelength region. The apparatus has an image pickup element that converts an object image into a picked-up image signal and a color filter that is formed on the image pickup element to transmit light in a wavelength region ranging at least from a visible wavelength region to an infrared wavelength region. The apparatus also has color signal extraction unit. The color signal extraction unit generates, from a picked-up image signal, color signals for a plurality of regions in the photographing screen and extracts the color signals thus generated. The apparatus further has regional wavelength component ratio calculation unit. The regional wavelength component ratio calculation unit detects a wavelength component ratio for each of the plurality of regions based on color signals of the plurality of regions extracted by the color signal extraction unit. One or more regions in which the visible light component ratio is large are selected based on the wavelength component ratios calculated by the regional wavelength component ratio calculation unit. The visible light component ratio of the photographing screen is determined based on a visible light component ratio(s) in the selected region(s).

An image pickup apparatus intended to achieve the above described object uses an apparatus that can pick up an image formed by light in a wavelength region ranging from a visible wavelength region to an infrared wavelength region. The image pickup apparatus has an image pickup element and a color filter that is formed on the image pickup element to transmit light in a wavelength region ranging at least from a visible wavelength region to an infrared wavelength region. The apparatus further has color signal extraction unit that generates and extracts, from a picked-up image signal, color signals for a plurality of regions in the photographing screen. The apparatus further has regional wavelength component ratio calculation unit that calculates a wavelength component ratio for each of the plurality of regions based on color signals of the plurality of regions extracted by the color signal extraction unit. The image pickup apparatus according to the present invention also has screen visible light component ratio calculation unit. The screen visible light component ratio calculation unit sets a visible light component ratio, among the wavelength component ratios calculated by the regional wavelength component ratio calculation unit, of a region in which the visible light component ratio is large as the visible light component ratio of the photographing screen.

According to the visible light component ratio calculation method according to the present invention, it is possible to calculate the ratio or proportion of a wavelength component in a range from the visible wavelength to the infrared wavelength contained in a light source. The calculation of the ratio of a wavelength component is performed for a plurality of regions in the photographing screen, and therefore a characteristic point(s) in an object can be extracted without being buried in the background. Therefore, it is possible to calculate the ratio of a wavelength component accurately in various scenes.

Thus, when the wavelength component ratio calculation unit according to the present invention is provided in a camera having a function of switching insertion/retraction of an infrared cut filter, it is possible to estimate, in the state in which the infrared cut filter is retracted, the brightness in the state in which the infrared cut filter is inserted. Thanks to this feature, it is possible to perform automatic insertion/retraction of the infrared cut filter without causing hunting irrespective of the type of the light source upon shooting.

In a mode of the present invention, the regional wavelength component ratio calculation unit has color coordinate area division unit for setting an area in a color coordinate system in which color signals can exist in accordance with the ratio of a wavelength component. The aforementioned calculation of the wavelength component ratio is performed based on the area in which color signals can exist that is set by the color coordinate area division unit and the position of the color signals for the plurality of regions in the aforementioned color coordinate system.

The color coordinate region division unit calculates the region in which color signals can exist based, for example, on positional relationship relative to a definition line or specific coordinates. Here, the definition line represents positions of the near-infrared light in a Cartesian coordinate system having two axis respectively representing the ratio of a color difference signal R-Y to a brightness signal Y and the ratio of a color difference signal B-Y to a brightness signal Y. The position of the near-infrared light positions on a different position on the definition line depending on the wavelength of the near-infrared light. The specified coordinates are positional coordinates on a visible light component ratio curve corresponding to visible light wavelengths in that Cartesian coordinate system.

The aforementioned selection can be performed only on regions among the plurality of regions subjected to the aforementioned selection in which the brightness signal level falls within a predetermined range. As the visible light component ratio of the photographing screen, the visible light component ratio of the region among the plurality of regions in which the visible light component ratio is the largest is set. Alternatively, regions among the plurality of regions subjected to the aforementioned selection in which the visible light component ratio is equal to or larger than a predetermined value may be selected, and when the number of the selected regions is equal to or larger than a predetermined number, the aforementioned predetermine value may be set as the visible light component ratio of the photographing screen.

In a mode of the present invention, the image pickup apparatus further has a wavelength band selection unit provided on the optical path of an image pickup optical system for selecting a specific wavelength band and insertion/retraction unit for inserting/retracting the wavelength band selecting unit into/from the optical path. The image pickup apparatus also has shooting mode switching unit for switching the shooting mode by controlling the insertion/retraction unit based on a signal indicative of the brightness of an object. The shooting mode switching unit switches the shooting mode based on the visible light component ratio calculated by the screen visible light component ratio calculation unit and the object brightness. The shooting mode switching unit corrects at least one of the object brightness signals and a threshold for switching of the shooting mode based on the visible light component ratio calculated by the screen visible light component ratio calculation unit.

The regional wavelength component ratio calculation unit may calculate the wavelength component ratio after setting a color signal gain for adjusting the white balance to a fixed value. In addition, the regional wavelength component ratio calculation unit may calculate the wavelength component ratio using an averaged color signal obtained by averaging the color signal over a predetermined time.

Further features of the present invention will become apparent from the following description of exemplary embodiments with reference to the attached drawings.

DESCRIPTION OF THE EMBODIMENTS

In the following, embodiments of the present invention will be described with reference to the drawings.

First Embodiment

Figure 1:
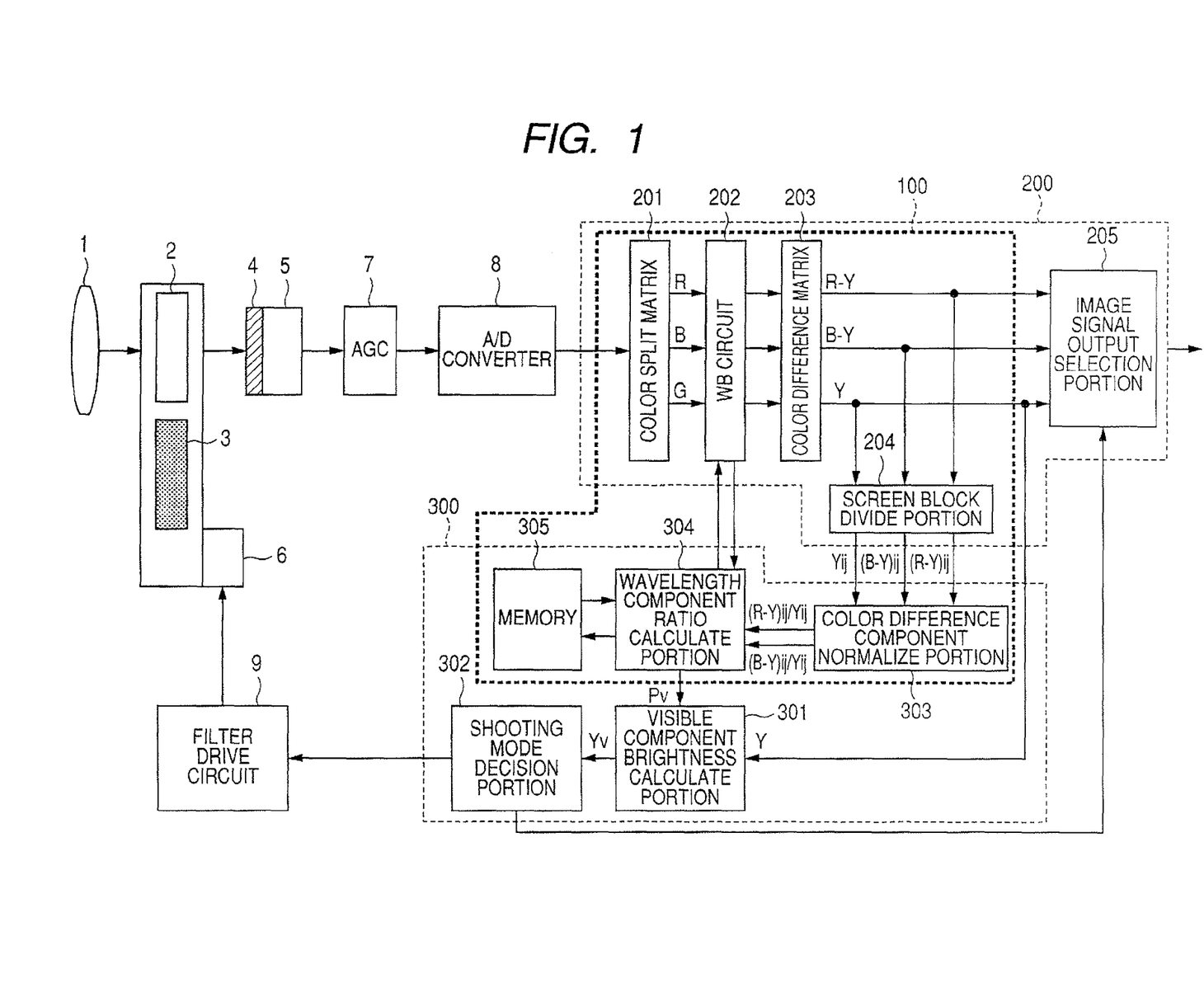
FIG. 1 is a block diagram illustrating the circuit conFIGuration of an image pickup apparatus according to an embodiment of the present invention.

FIG. 1 is a block diagram of an image pickup apparatus according to the present invention. The image pickup apparatus calculates the visible light component using the visible light component ratio calculating method according to the present invention, and inserts/retracts an infrared cut filter.

In FIG. 1, light reflected from a subject shot by a shooting optical system 1 is transmitted through an optical path length correction filter 2 and incident on an image pickup element 5 through an image pickup element color filter 4. An analogue picked-up image signal from the image pickup element 5 is amplified by an AGC 7, and then converted into a digital picked-up image signal by an A/D converter 8. The picked-up image signal from the A/D converter 8 is separated into a red signal R, a blue signal B and a green signal G by a color separation matrix 201. A WB circuit 202 adjusts the R gain and the B gain based on the red signal R, the blue signal B and the green signal G input from the color separation matrix 201 in such a way as to provide correct white balance. A color difference matrix 203 converts the red, blue and green signals R, B and G that have been adjusted to provide correct white balance into color difference signals R−Y and B−Y and a brightness signal Y. A shooting mode decision portion 302 decides the shooting mode. When the shooting mode decided is color shooting mode, an image signal output selection portion 205 outputs the color difference signals R−Y, B−Y and the brightness signal Y. On the other hand, when the shooting mode decided is black-and-white shooting mode, the image signal output selection portion 205 outputs only the brightness signal Y.

A screen visible light component ratio calculation portion 100 calculates the ratio of a wavelength component based on the color difference signals R−Y, B−Y obtained in an image signal processing circuit 200. The screen visible light component ratio calculation portion 100 is constituted as a part of processing executed in the image signal processing circuit 200 and a micro computer 300. The conFIGuration and operation of the color separation matrix 201, the WB circuit 202 and the color difference matrix 203 are as described above.

The color difference signals R−Y, b−Y and the brightness signal Y resulting from conversion by the color difference matrix 203 are input to the screen block dividing portion 204. The screen block dividing portion 204 calculates the color difference signals R−Y, b−Y and the brightness signal Y in each of a plurality of blocks or segments in the photographing screen.

Figure 2:
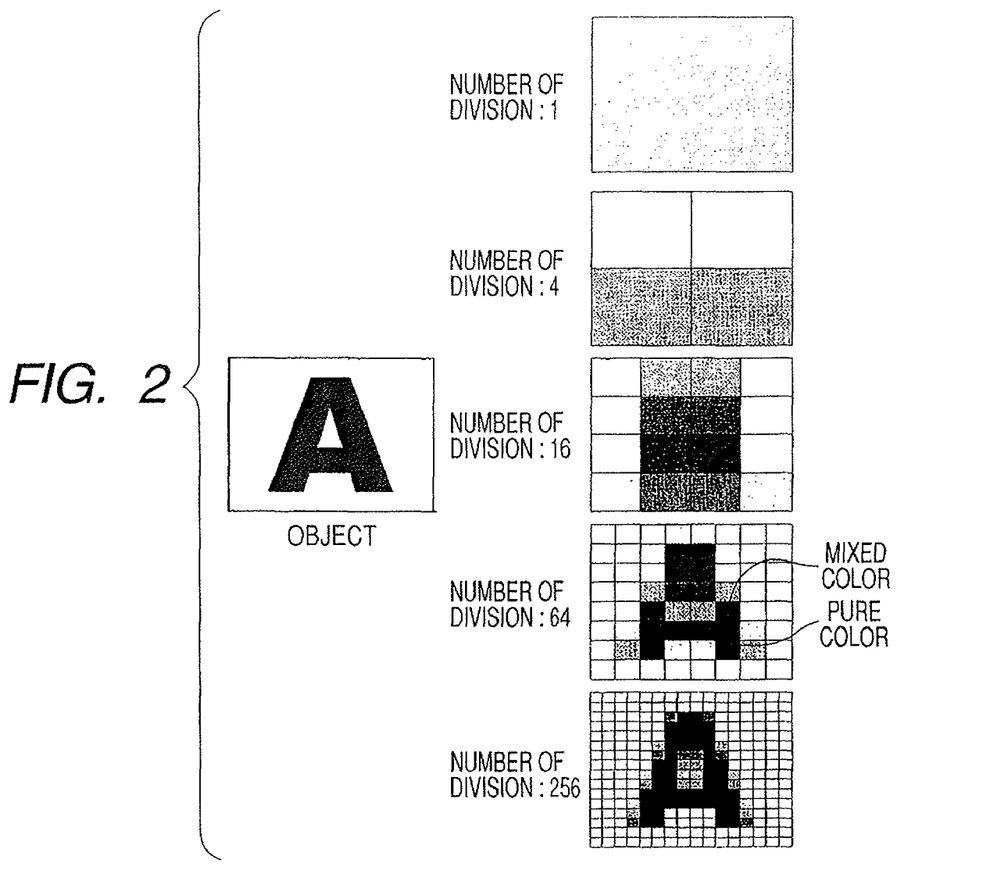
FIG. 2 illustrates changes in the accuracy in extracting color difference signals depending on the number of division of a screen.

In connection with this, the larger the number of divisions of the photographing screen in the screen block dividing portion 204 is, or the more the screen is segmented, the more the accuracy in extracting the color difference signals are enhanced. FIG. 2 illustrates changes in the extracted color in each of the segments with an increase in the number of divisions of the screen. When the number of divisions is small, the extracted color is a mixed color resulting from mixture of the color of the subject and the color of the background. As the number of division increases, the color of the subject and the color of the background become more and more clearly distinguished. When the number of division is sufficiently large, the color of the subject and the color of the background can be extracted as pure colors or mixed colors close to the pure colors. Therefore, to accurately extract the color of the subject contained in the photographing screen, it is desirable to increase the number of divisions of the photographing screen to make the segment as small as possible when extracting the color difference signals.

Reference numeral 303 in FIG. 1 designates a color difference component normalizing portion. The color difference signals (R−Y)ij, (B−Y)ij in each block input from the screen block dividing portion 204 is normalized by dividing them by the brightness signal Yij. Thus, variations in the color difference signals depending on the brightness signal are avoided. In the case where variations in the color difference depending on the brightness do not occur and the color difference signals are obtained based only on the color components, the above process may be omitted. Suffix "ij" indicates that the signal or data suffixed with it is that on the block in the i-th column and j-th row.

The wavelength component ratio calculation portion 304 calculates the ratio of a wavelength component based on the normalized color difference signals (R−Y)ij/Yij, (B−Y)ij/Yij input, the white balance gain in WB circuit 202 and data stored in a memory 305. In the memory 305 is stored data of the distribution range of the color difference signals corresponding to the ratio of the visible light component. The aforementioned data is read out when a wavelength component ratio is calculated. In the case where the ratio of a wavelength component is calculated based on time-averaged color signals, color difference signals during several Vs (where V is the vertical deflection period, i.e. the period of one frame) in the past are also stored in the memory 305. The visible light component brightness calculation portion 301 calculates the brightness of a visible light component Yv from the brightness signal Y and the visible light component ratio Pv calculated in the wavelength component ratio calculation portion 304. The visible light component brightness Yv thus calculated is input to the shooting mode decision portion 302.

The shooting mode decision portion 302 makes a decision as to whether the shooting mode is to be switched or not by comparing the input visible light component brightness Yv and shooting mode switching thresholds $Y_D$ and $Y_N$ that have been set in advance. The shooting mode switching threshold $Y_D$ is the threshold referred to when switching the shooting mode from black-and-white shooting mode to color shooting mode, and the shooting mode switching threshold $Y_N$ is the threshold referred to when switching the shooting mode from color shooting mode to black-and-white shooting mode. Typically, a hysteresis is set between $Y_D$ and $Y_N$, in order to avoid hunting. Namely, $Y_D>Y_N$.

In the prior art in which only a hysteresis is set, hunting occurs when in black-and-white shooting mode under a light source in which the ratio of the visible light component is very small and an infrared component is larger than the hysteresis. In this embodiment, the ratio of a wavelength component is calculated in accordance with the later-described method. The shooting mode is switched from black-and-white shooting mode to color shooting mode based on the result of that calculation.

When the mode decided in the shooting mode decision portion 302 is color shooting mode, a filter drive circuit 9 operates to insert an infrared cut filter 3, and an image signal output selecting portion 205 outputs a color image. When the mode decided is black-and-white shooting mode, the filter drive circuit 9 operates to retract the infrared cut filter 3, and the image signal output selecting portion 205 outputs a black-and-white image. A filter drive motor 6 operates in such a way as to insert/retract the infrared filter 3 according to a signal from the filter drive circuit 9.

In the following, how the shooting mode is decided and how the ratio of a wavelength component is calculated will be described. First, a method of deciding the shooting mode will be described with reference to a flow chart in FIG. 3. A determination is made by the photographing mode decision portion 302 as to whether the current shooting mode is color shooting mode or black-and-white shooting mode (S101). When the current shooting mode is color shooting mode, the brightness signal Y is compared with the threshold $Y_N$ for switching from color shooting mode to black-and-white shooting mode (S107). When the state in which the brightness signal Y is equal to or smaller than the threshold $Y_N$ for switching to black-and-white shooting mode continues for a predetermined time Twait, the infrared filter is retracted, and the shooting mode is changed to black-and-white shooting mode (S108, s109). Switching from color shooting mode to black-and-white shooting mode is performed in the above described manner. The reason why in switching the shooting mode, the determination is made over the predetermined period Twait is to prevent erroneous determination that leads to hunting or the like due to abrupt light such as headlights of a vehicle.

Figure 3:
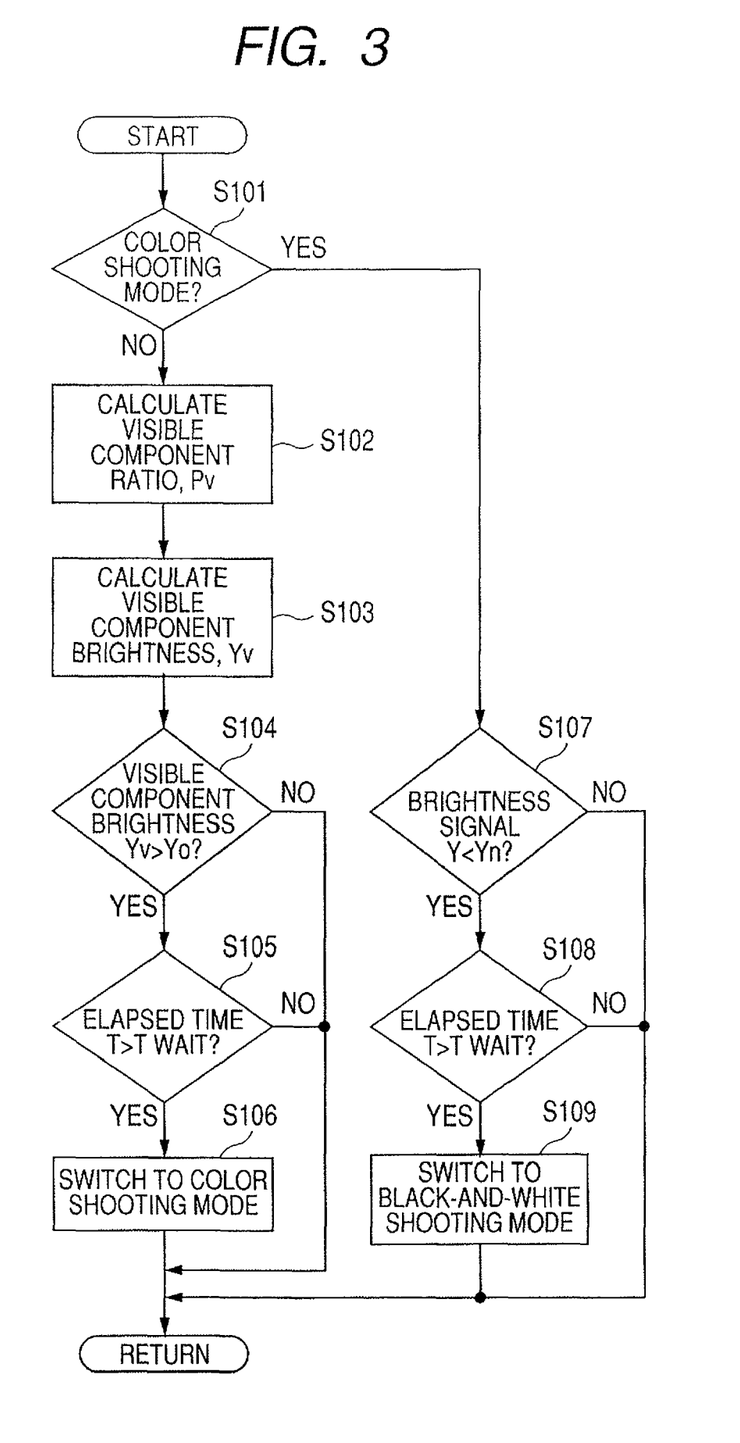
FIG. 3 is a flow chart of a shooting mode switching according to a first embodiment of the present invention.

Mode switching in the case that the current shooting mode is black-and-white shooting mode will now be described. First, the ratio Pv of the visible light component to light of the whole wavelength range is calculated by the wavelength component ratio calculation portion 304 (S102). The process of calculating the wavelength component ratio will be described in detail later. The visible light component brightness calculation portion 301 calculates the brightness Yv of the visible light component as follows based on the brightness signal Y and the visible light component ratio Pv (S103).

$$Yv=Y*Pv/100$$

In this embodiment, the brightness of the visible light component Yv is calculated using the ratio of the visible light component Pv. However, the brightness of the visible light component Yv may be calculated in the following manner using the ratio of the infrared light component Pir, which can be calculated by the wavelength component ratio calculation portion 304.

$$Yv=Y*(1-Pir)/100$$

Then, a determination is made by the shooting mode decision portion 302 as to whether or not the brightness of the visible light component Yv is equal to or larger than the threshold $Y_D$ for switching from black-and-white shooting mode to color shooting mode (S104). When the state in which the brightness of the visible light component Yv is equal to or larger than the threshold for switching to color shooting mode continues for a predetermined time Twait, the infrared filter is inserted, and the shooting mode is switched to color shooting mode.

Next, how the ratio of a wavelength component is calculated in the wavelength component ratio calculation portion 304 will be descried with reference to FIGS. 4A to 4C, 5A to 5D and 6.

Figure 4A:
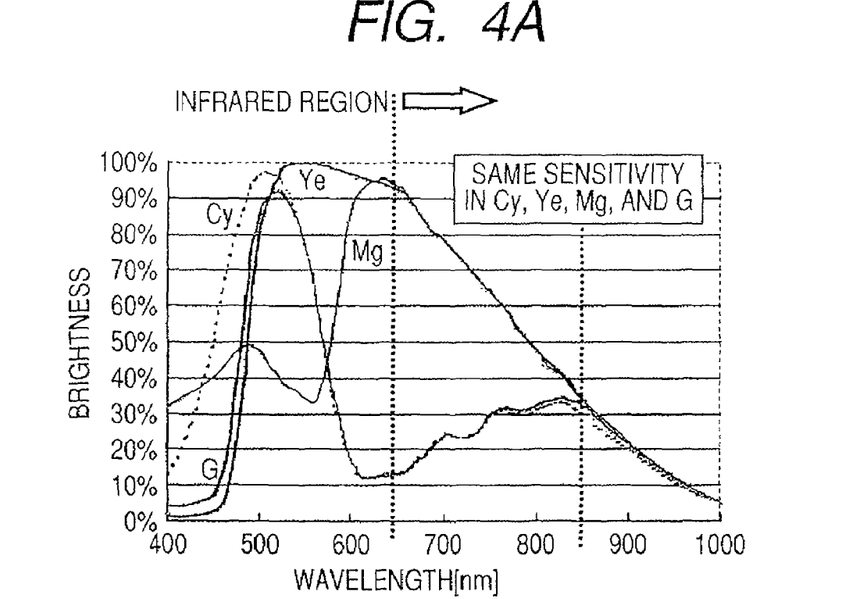
FIG. 4A is a graph illustrating spectral transmitting characteristics of a complementary color filter.
Figure 4B:
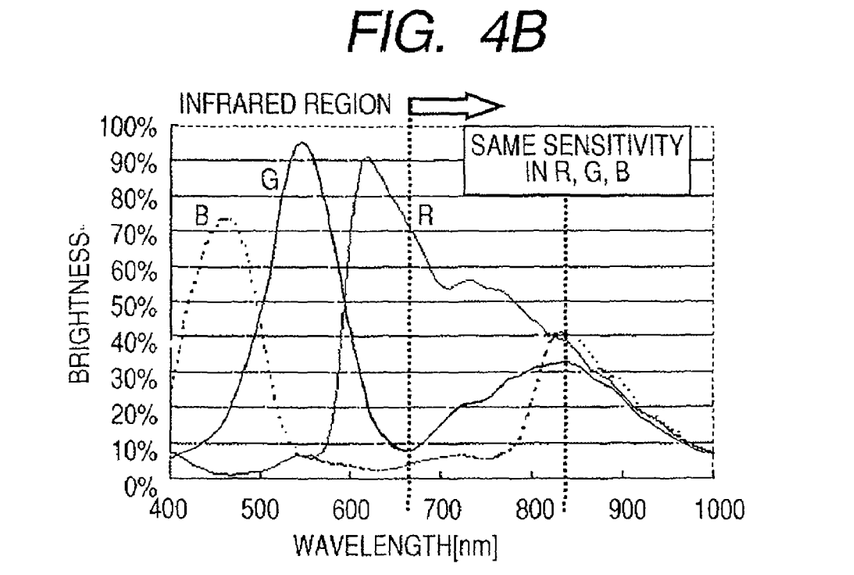
FIG. 4B is a graph illustrating spectral transmitting characteristics of a primary color filter.
Figure 5A:
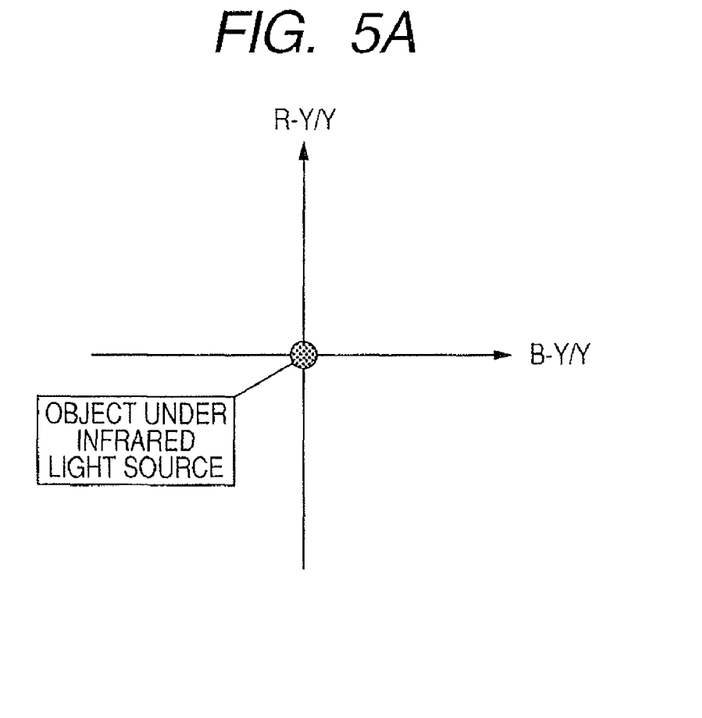
FIG. 5A illustrates distribution of color signals under an infrared light source.

FIG. 4A illustrates spectral characteristics of a complementary color filter, and FIG. 4B illustrates spectral characteristics of a primary color filter. In these filters, beyond approximately 820 nm, sensitivities to cyan Cy, yellow Ye, magenta Mg and green G become equal to each other in the case of the complementary color filter, and sensitivities to red R, green G and blue B become equal to each other in the case of the primary color filter. Therefore, under an infrared light source (with a wavelength range equal to or larger than approximately 820 nm), the color difference signals of an object converges to a fixed point as illustrated in FIG. 5A, as long as the WB gain is fixed.

Figure 5B:
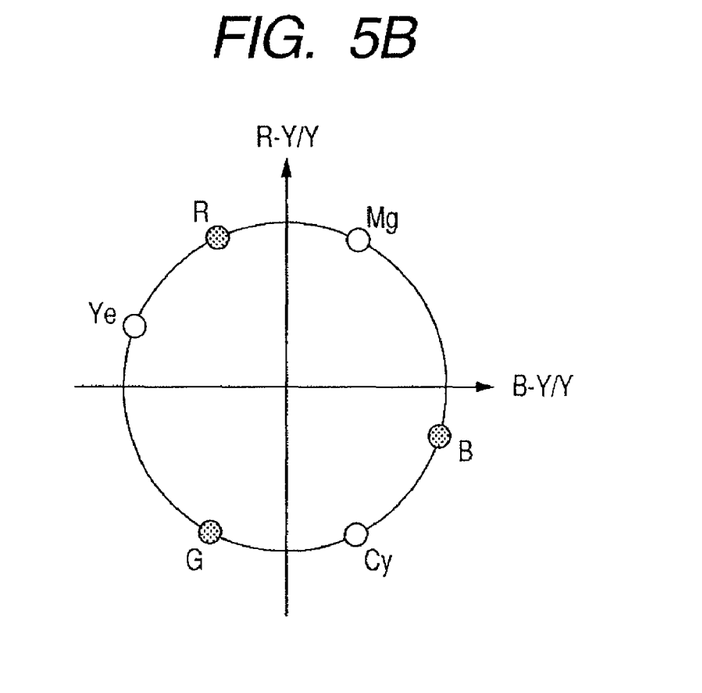
FIG. 5B illustrates distribution of color signals under a visible light source.
Figure 5C:
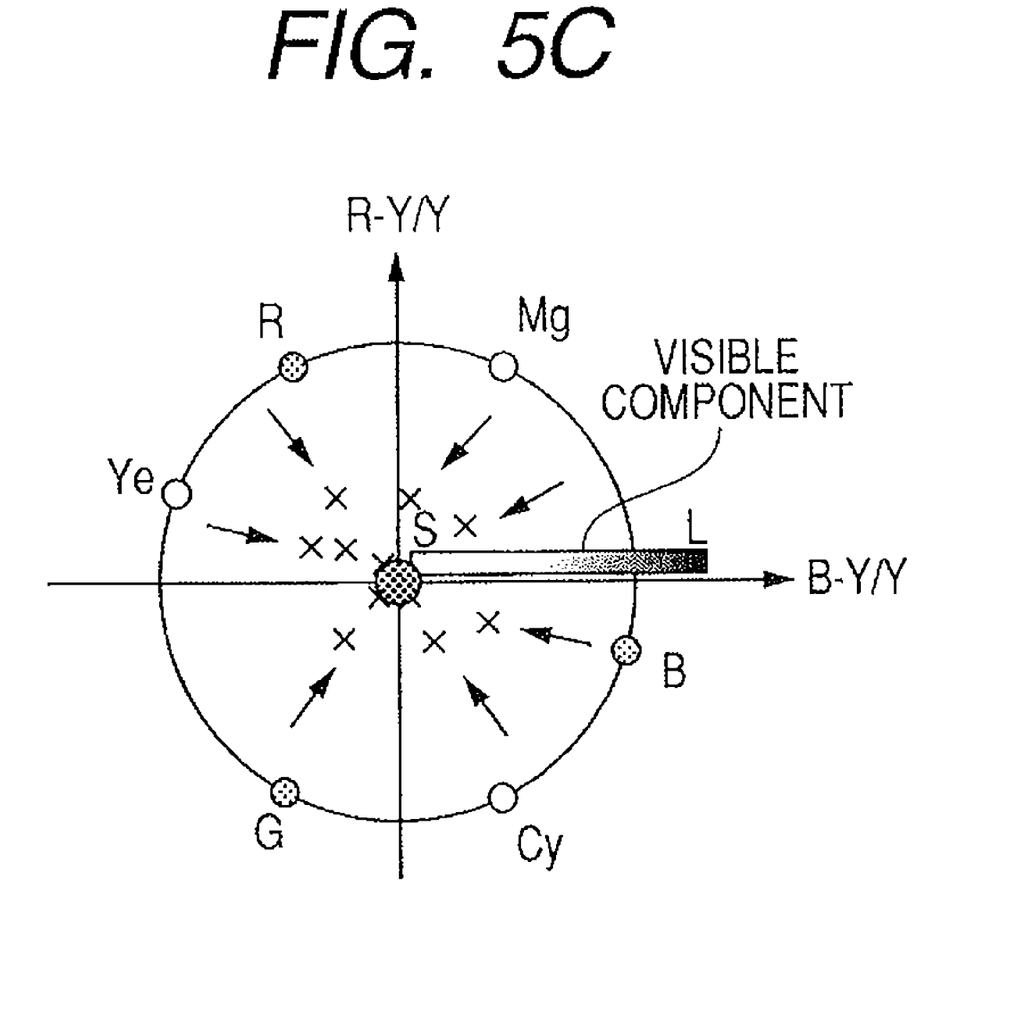
FIG. 5C illustrates distribution of color signals under a visible-infrared mixed light source.

In view of this, the WB gain is fixed in such a way that under an infrared light source, the point representing the ratios of the color difference signals R−Y and B−Y to the brightness signal Y in the Cartesian coordinate system constituted by (R−Y)/Y axis and (B−Y)/Y axis (which will be hereinafter referred to as color coordinate system) comes to the point of origin. Then, under an infrared light source, points representing the signals for all the objects come to the point of origin in the color coordinate system as illustrated in FIG. 5A. Under a visible light source (with a wavelength range of 400 to 650 nm), points in the color coordinate system disperse according to object colors R, Ye, G, Cy, B and Mg as illustrated in FIG. 5B. Under a visible-infrared mixed light source, the distribution of points representing color signals changes depending on the ratio of the visible light and the infrared light (FIG. 5B) Specifically, when the ratio of the visible component is large, there are points located far from the point of origin of the color coordinate system. As the ratio of the infrared component increases and the infrared component becomes dominant, the points in the color coordinate system approach to the point of origin (FIG. 5C). Although in this embodiment, the WB gain is fixed so that points in the color coordinate system come to the point of origin under infrared light sources, the present invention is not limited to this particular feature. It is sufficient that the point for white under visible light sources comes to the point of origin or the WB gain is fixed to a specific WB gain under sunlight.

Figure 5D:
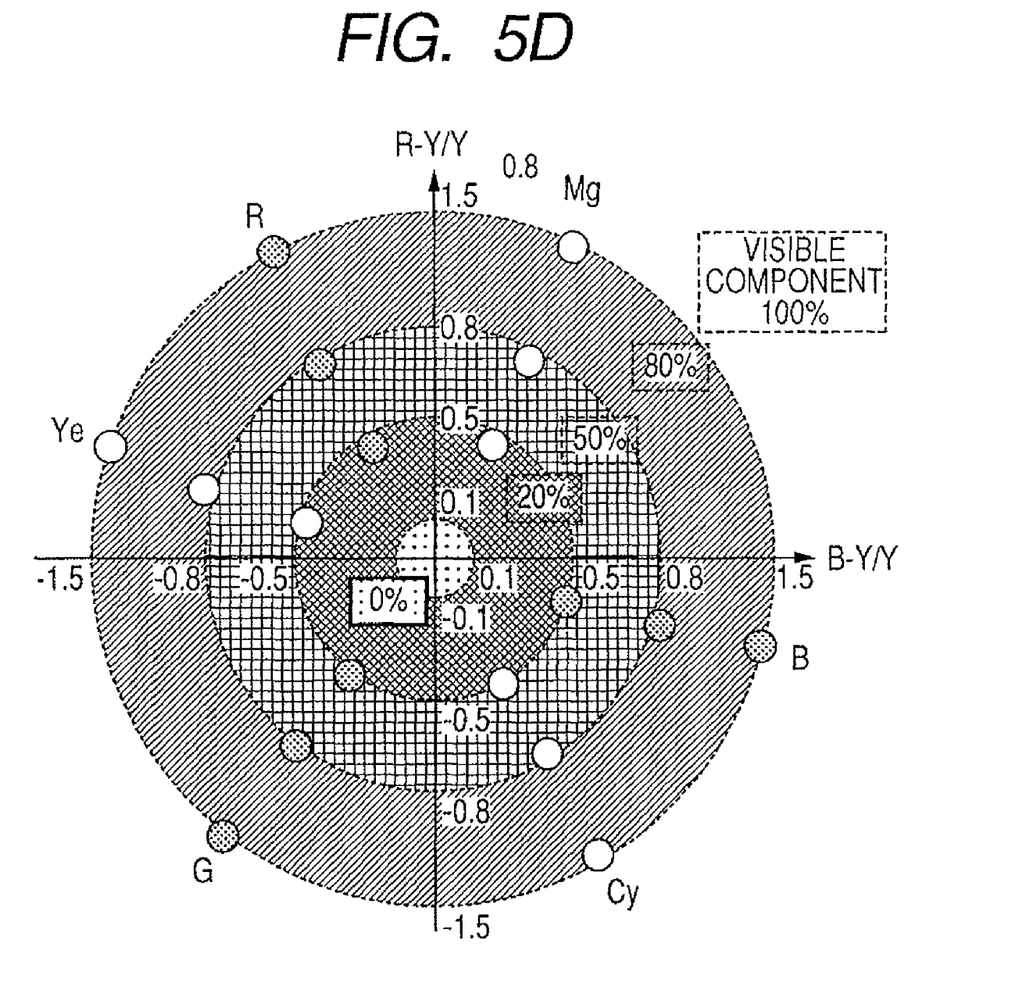
FIG. 5D illustrates distribution areas of color signals according to ratios of visible light and infrared light.

FIG. 5D illustrates areas in which points associated with different colors are distributed for different ratios of mixture of the visible light source and the infrared light source. In this embodiment, the points associated with all the colors fall within a specific area in accordance with the ratio of visible light component, as illustrated in FIG. 5D. Thus, the photographing screen is segmented into blocks, and the visible light component ratio is calculated from the extracted color for each of the blocks. The visible light component ratio in a block(s) among the aforementioned blocks in which the ratio calculated is large is set as the visible light component ratio of the photographing screen. By the above described determination process, it is possible to calculate the visible light component ratio without missing a characteristic point in the photographing screen.

In the case where the type of the light source varies among blocks in the photographing screen, the following method is advantageous. That is, when the number of the blocks in which the visible light component ratio calculated is greater than a predetermined ratio is larger than a predetermined number, the visible light component ratio which is greater than the aforementioned predetermined ratio is set as the visible light component ratio of the photographing screen. This unit that the visible light component in the photographing screen is determined based on the visible light component ratios of a plurality of blocks in which the visible light component ratio is large. By using this method, it is possible to discover a characteristic point in the photographing screen and to calculate the visible light component ratio of the photographing screen even when the type of the light source varies among blocks.

Figure 6:
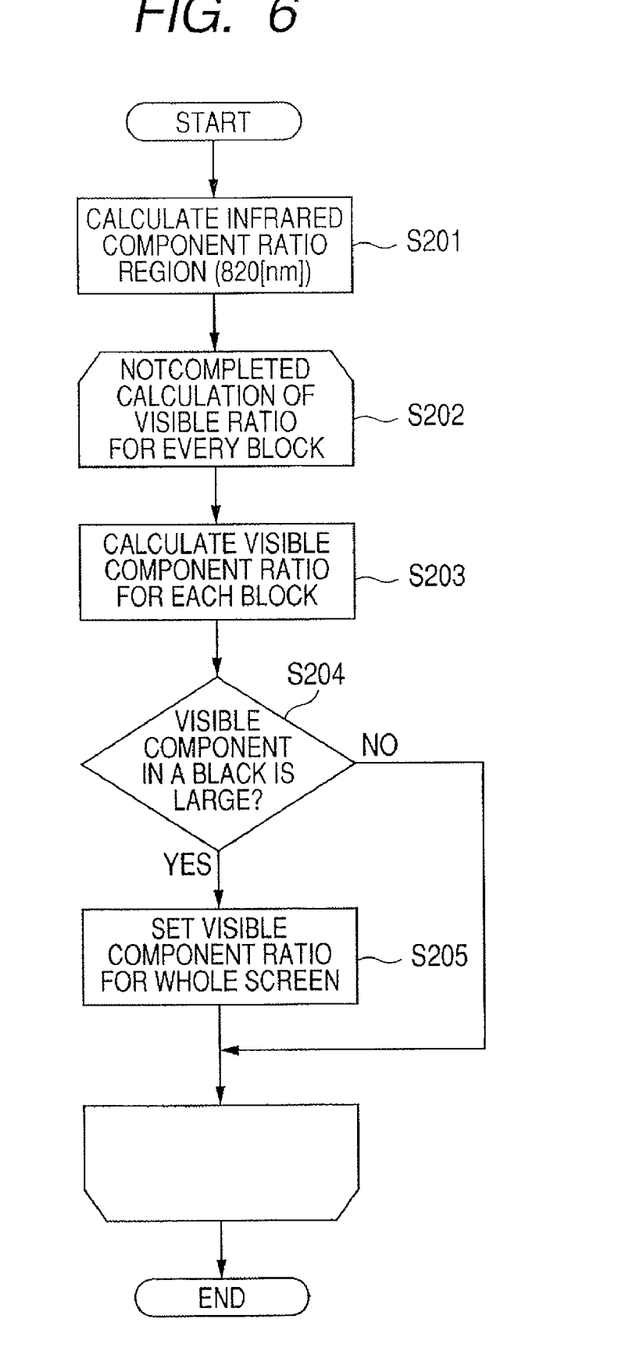
FIG. 6 is a flow chart of a process of calculating visible light component under a visible-infrared mixed light source.

Here, how the wavelength component ratio is calculated will be described with reference to a flow chart in FIG. 6. First, the distribution area of the color difference signals R−Y, B-Y corresponding to the visible light component ratio like that illustrated in FIG. 5C is determined (S201). The distribution area of the color signal corresponding to the ratio of the visible light component changes depending on the filter characteristics of the image pickup element, the WB gain and the type of the color signals etc. In view of this, data on the distribution area is obtained based on properties of the image pickup system of the camera and stored in the memory 305 in advance. In this embodiment, the color signals used are color difference signals. However, the color signals are not limited to color difference signals, but a red signal R and a blue signal B before converted into color difference signals may also be used.

The visible light component ratio is calculated for each block from a color signal in each block (S203). The visible light component ratio in a block among the blocks in which the ratio calculated is large is set as the visible light component ratio of the whole the screen (S205).

In the above process, the blocks in which the value of the brightness signal Yij is equal to or smaller than a predetermine value or extraordinarily large due to an abnormally low or high intensity of the brightness signal are left out. By using only the blocks in which the brightness component is within a predetermined range in making the determination, it is possible to calculate the visible light component more accurately. Since the shooting mode is generally switched under a low light condition, the gain is set high, and therefore the signals contain a large amount of noise components. Influences of random noise can be reduced by time-averaging the signal.

According to the method of this embodiment, it is possible to calculate the ratio of the visible light component by dividing the distribution area of colors in accordance with the ratio of the visible light component. Furthermore, a characteristic point in the photographing screen can be extracted easily by setting the visible light component in a block in which the visible light component calculated is large as the visible light component of the photographing screen. Therefore, it is possible to calculate the visible light component accurately.

Second Embodiment

The second embodiment uses a method of calculating the ratio of a wavelength component that is different from that in the first embodiment. In the following only what is different in the second embodiment from the first embodiment will be described.

A method of calculating the ratio of the near-infrared wavelength component (650 to 820 nm) using a definition line will be described with reference to FIGS. 7A, 7B and 7C.

Figure 7A:
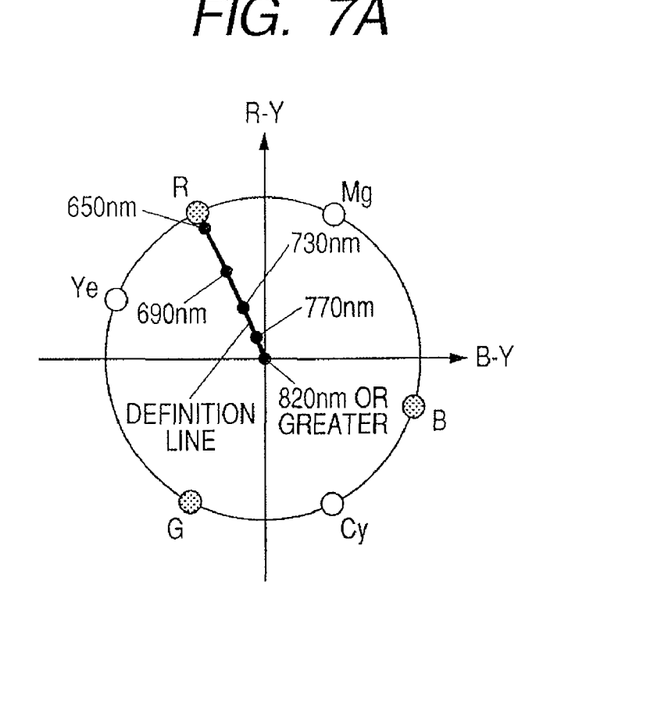
FIG. 7A illustrate distribution of color signals under a near-infrared light source.
Figure 7B:
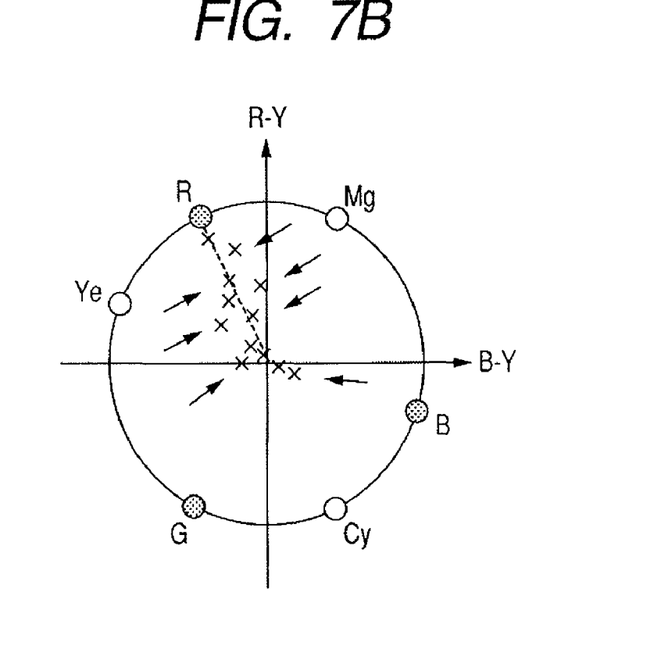
FIG. 7B illustrates distribution of color signals under a visible-near-infrared mixed light source.

FIG. 7A is a graph illustrating the distribution of points representing the color difference signals under illumination by a single wavelength component for different wavelengths. It is assumed that the WB gain is fixed. The points representing the color difference signals for an object under a near-infrared light source (650 to 820 nm) are distributed only on a definition line Lir. Under a mixed light source including visible light and near-infrared light (650 to 820 nm), points representing the light signals from an object approach to the definition line Lir as the ratio of the near-infrared light increases (FIG. 7B). Therefore, it is possible to calculate the ratio of the near-infrared light and the visible light based on the distance from the definition line Lir. The distribution area of color components is determined in accordance with the ratio of the near-infrared light and the visible light. Therefore, the photographing screen may be segmented into blocks, the ratio of the near-infrared component and the visible light component may be calculated in each block, and the visible light component ratio in a block(s) among the blocks subjected to calculation in which the ratio calculated is large may be set as the visible light component ratio of the photographing screen.

As is the case in the first embodiment, the values of the color signals R-Y, B-Y vary depending on the WB gain. Therefore, it is necessary that the WB gain be fixed or the calculation of the wavelength component ratio be performed taking into account the WB gain.

Here, a method of calculating the wavelength component ratio using the definition line will be described with reference to a flow chart in FIG. 8. First, the distribution area of the color difference signals R-Y, B-Y corresponding to the visible light component ratio like that illustrated in FIG. 7C is determined (S301). The distribution area of the color signal corresponding to the ratio of the visible light component changes depending on the filter characteristics of the image pickup element, the WB gain and the type of the color signals etc. In view of this, data on the distribution area is obtained based on properties of the image pickup system of the camera and stored in the memory 305 in advance. In this embodiment, the color signals used are color difference signals. However, the color signals are not limited to color difference signals, as mentioned in the description of the first embodiment.

The ratio of the visible light component is calculated in each block based on color signals in each block (S303). The visible light component ratio in a block among the blocks in which the ratio calculated is large is set as the visible light component ratio of the whole the screen (S305). As described above, by setting the visible light component ratio in a block(s) among the blocks in which the ratio calculated is large as the visible light component ratio of the photographing screen, it is possible to calculate the visible light component ratio without missing a characteristic point in the photographing screen.

In some cases, the type of the light source varies among blocks in the photographing screen. In such cases the following method is advantageous. That is, when the number of the blocks in which the visible light component ratio calculated is greater than a predetermined ratio is larger than a predetermined number, the visible light component ratio equal to or greater than the aforementioned predetermined ratio is set as the visible light component ratio of the photographing screen. Alternatively, the visible light component in the photographing screen is determined based on the visible light component ratios in a plurality of blocks in which the visible light component ratio is large. By using these methods, it is possible to discover a characteristic point in the photographing screen and to calculate the visible light component ratio of the photographing screen even when the type of the light source varies among blocks.

In this second embodiment, the color signals used are color difference signals. However, the color signals are not limited to color difference signals, but a red signal R and a blue signal B before converted into color difference signals may also be used.

In the above process, in the blocks in which the value of the brightness signal Yij is equal to or smaller than a predetermine value or the blocks in which the value of the brightness signal Yij is extraordinarily large, noise components may affect greatly or the color difference components are not calculated accurately. In view of this, the blocks in which the intensity of the brightness signal is extremely low or high may be left out, and only the blocks in which the brightness component is within a predetermined range may be used in making the determination. Thus, it is possible to calculate the visible light component more accurately. Since the shooting mode is generally switched under a low illuminance condition, a gain in the AGC is set high, and therefore the signals contain a large amount of noise components. Influences of random noise can be reduced by time-averaging the signal.

According to the second embodiment, it is possible to calculate the ratio of the visible light component, as is the case with the first embodiment. Furthermore, a characteristic point in the photographing screen can be extracted easily by setting the visible light component in a block in which the amount of visible light component is calculated most as the visible light component of the photographing screen. Therefore, it is possible to calculate the visible light component accurately.

Third Embodiment

In the third embodiment, the method according to the first embodiment and the method according to the second embodiment are used together. Accordingly, only what is different from the first and the second embodiments will be described in the following.

Figure 7C:
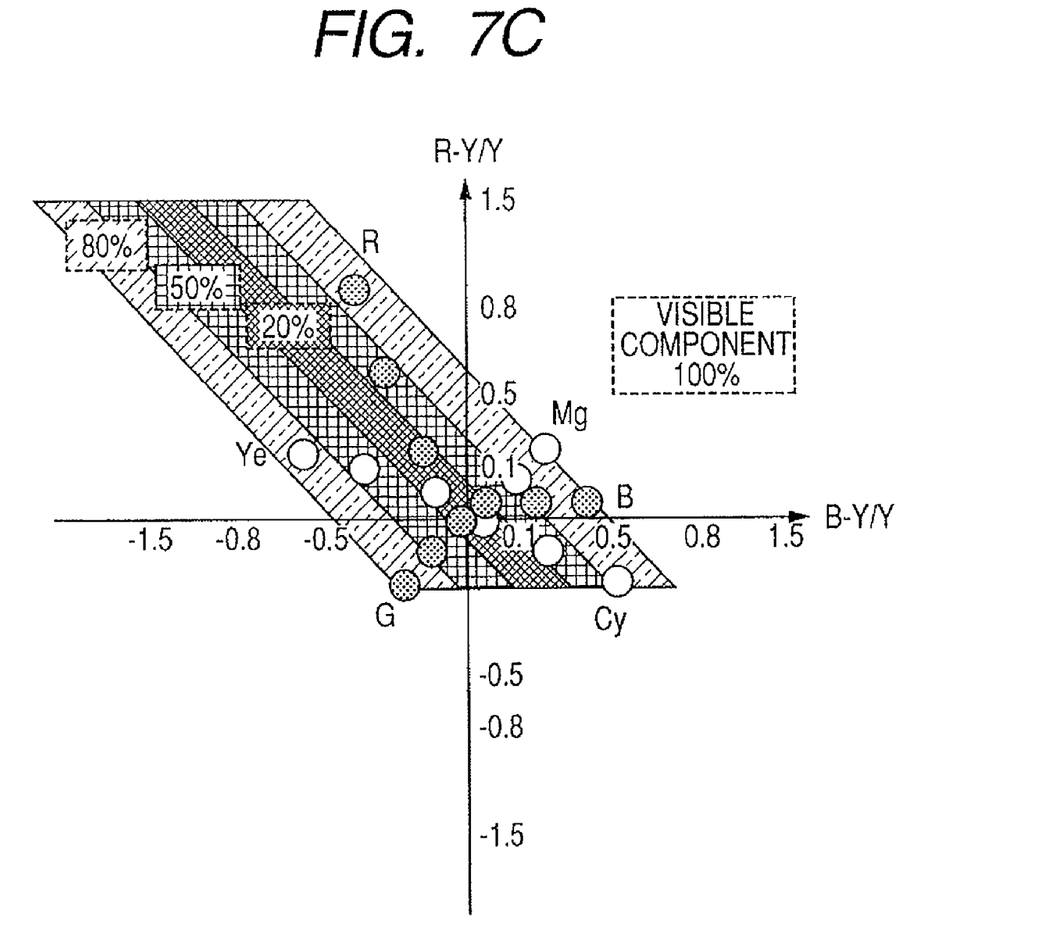
FIG. 7C illustrates distribution areas of color signals according to ratios of visible light and near-infrared light.
Figure 8:
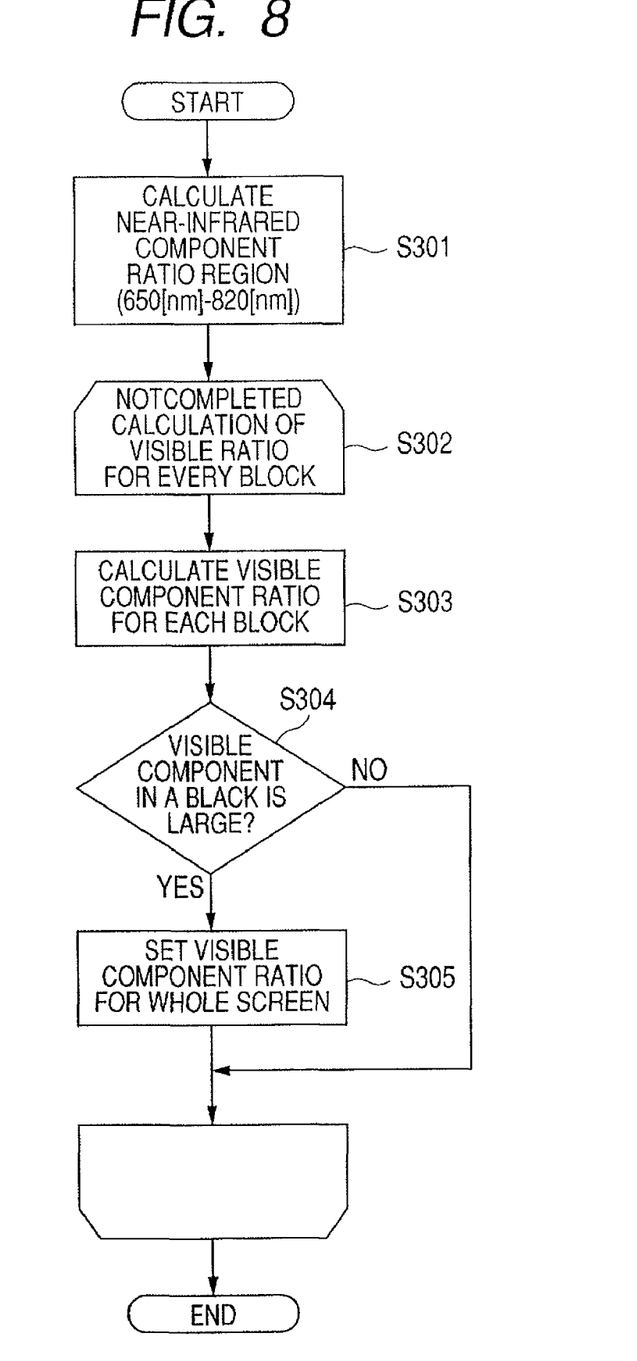
FIG. 8 is a flow chart of a process of calculating visible light component under a visible-near-infrared mixed light source.

By using the methods according to the first and the second embodiments, it is possible to calculate the ratio of the infrared light and the visible light and the ratio of the near-infrared light and the visible light as illustrated respectively in FIGS. 5D and 7C. When there are wavelength components ranging over the visible light, near-infrared light and infrared light as is the case under incandescent light source or sunlight, it is possible to calculate the ratio of the visible light component more accurately by using the methods of calculating the wavelength component ratio according to the first and the second embodiments in combination.

Figure 10:
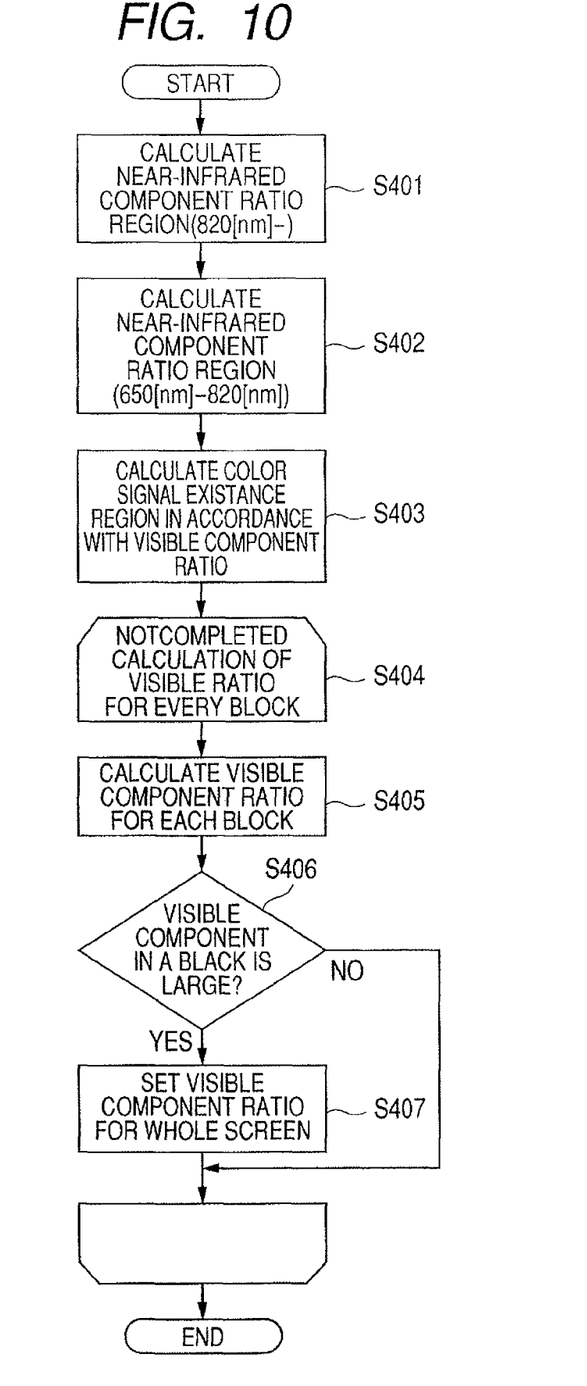
FIG. 10 is a flow chart of a process of calculating visible light component under a visible-near-infrared-infrared mixed light source.

The method of calculating the wavelength component ratio according to the third embodiment will be described with reference to a flow chart of FIG. 10. First, the infrared component ratio region (820 nm) is calculated using the method according to the first embodiment (S401). Then, the near-infrared component ratio region is calculated using the method according to the second embodiment (S402). In step S403, the distribution area of the color difference signals R−Y, B−Y corresponding to the visible light component ratio is calculated.

Figure 9:
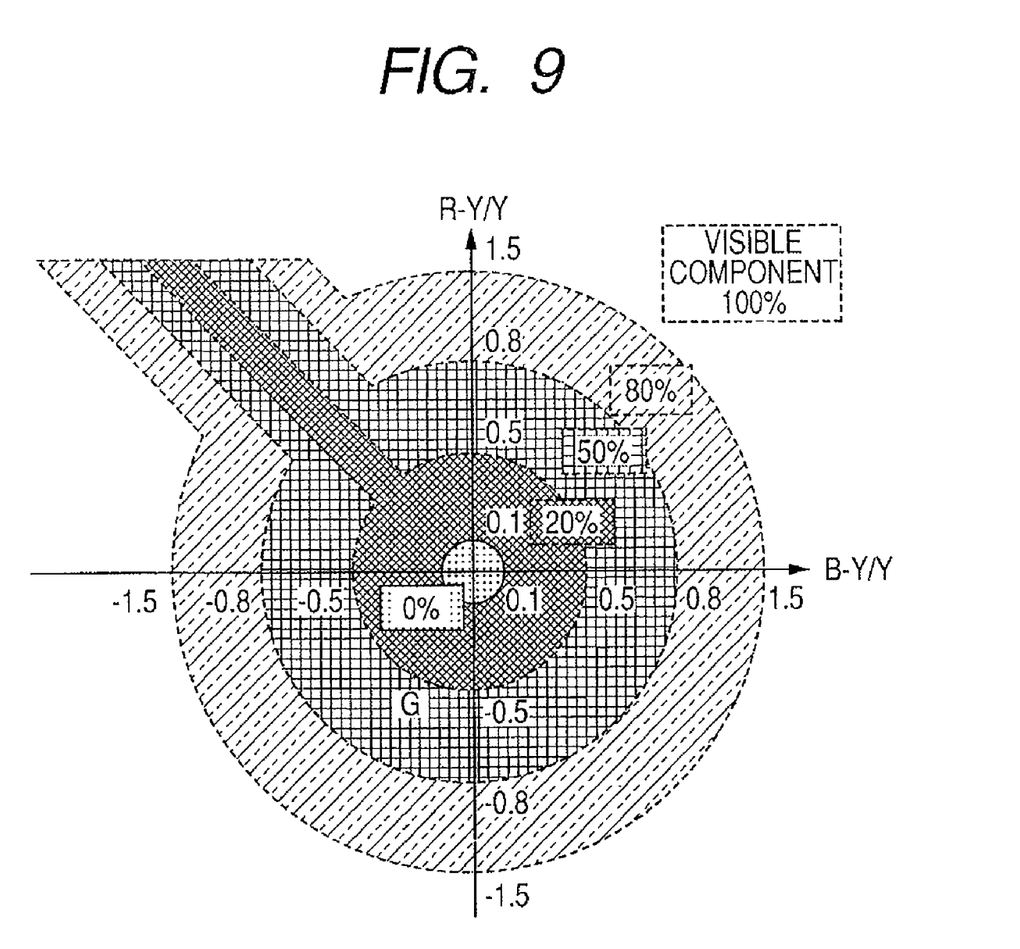
FIG. 9 illustrates distribution areas of color signals according to ratios of visible light, near-infrared light and infrared light.

In calculating the distribution area of the color difference signals, it is necessary to calculate the area to which the color difference signals converge in accordance with the ratio of the visible light component. To this end, the distribution areas of the color difference signals by infrared light and near-infrared light illustrated in FIGS. 5C and 7D are superimposed. In the overlapping area, the smaller visible light component ratio is applied. Thus, the areas in which the color difference signals exist for different ratios of the visible light component are as illustrated in FIG. 9. After calculating the areas in which the color difference signals fall, the ratio of the visible light component is calculated in each block based on the distribution of the color difference components. The visible light component in a block in which the amount of the visible light component is calculated most is set as the visible light component of the whole screen (S404, S405, S406 and S407).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-028923, filed on Feb. 6, 2006, which is hereby incorporated by reference herein in its entirety.

What is claimed is:

1. A visible light component ratio calculation method comprising:
a conversion step of converting an image of an object imaged on an image pickup element having a color filter that transmits light in a wavelength region ranging at least from a visible light wavelength region to an infrared wavelength region, into a picked-up image signal;
a color signal extraction step for generating and extracting, from the picked-up image signal, color signals for a plurality of regions in a photographing screen;
a regional wavelength component ratio detection step for detecting a wavelength component ratio for each of the plurality of regions based on color signals of the plurality of regions extracted by the color signal extraction step; and
a visible light component ratio selection step for selecting specific regions from the plurality of regions having a visible light component that is relatively large as detected by the regional wavelength component ratio detection step; and
a visible light component ratio determination step for determining the visible light component ratio Pv of the photographing screen based on a visible light component ratio in the selected specific regions and not based on a visible light component ratio in a region having a relatively small visible light component,
a visible component brightness calculation step for calculating the visible component brightness Yv based on a brightness signal of the color signal Y and the determined visible light component ratio Pv,
wherein Yv=Y*Pv/100; and
a cut filter insertion step for inserting a cut filter depending on the visible component brightness Yv as calculated by the visible component brightness calculation step using the determined visible light component ratio Pv.

2. A visible light component ratio calculation method comprising:
a conversion step of converting an image of an object imaged on an image pickup element having a color filter that transmits light in a wavelength region ranging at least from a visible light wavelength region to an infrared wavelength region, into a picked-up image signal;
a color signal extraction step for generating and extracting, from the picked-up image signal, color signals for a plurality of regions in a photographing screen;
a regional wavelength component ratio detection step for detecting a wavelength component ratio for each of the plurality of regions based on color signals of the plurality of regions extracted by the color signal extraction step; and
a visible light component ratio selection step for selecting specific regions from the plurality of regions having a visible light component that is large as detected by the regional wavelength component ratio detection step; and
a visible light component ratio determination step for determining the visible light component ratio Pv of the photographing screen based on a visible light component ratio that is the largest in the selected specific regions and not based on a visible light component in a region having a visible light component ratio that is smaller than an infrared light component ratio,
a visible component brightness calculation step for calculating the visible component brightness Yv based on a brightness signal of the color signal Y and the determinate visible light component ratio Pv,
wherein Yv=Y*Pv/100; and
a cut filter insertion step for inserting a cut filter depending on the visible light component brightness Yv of the photographing screen determined by the visible light component brightness calculation step.

* * * * *